United States Patent Office 3,553,189
Patented Jan. 5, 1971

3,553,189
AMINO-NAPHTHOL-AZO-PHENYL DYES
Hiroshi Sugiyama, Ashiya-shi, Hideo Otsuka, Ibaragi-shi, and Masakazu Yamamoto, Takarazuka-shi, Japan, assignors to Sumitomo Chemical Company, Ltd., Higashi-ku, Osaka, Japan, a corporation of Japan
No Drawing. Filed Nov. 24, 1967, Ser. No. 685,291
Claims priority, application Japan, Apr. 13, 1967, 42/23,838
Int. Cl. C07c *107/04;* C09b *29/30*
U.S. Cl. 260—198          15 Claims

ABSTRACT OF THE DISCLOSURE

Clear bluish red reactive dyes represented by the formula,

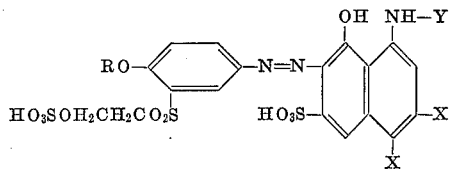

wherein R is methyl or ethyl; one X is hydrogen and the other X is a sulfonic acid group; and Y is an acetyl or chloroacetyl, or is a benzoyl or benzenesulfonyl group, the benzoyl or benzenesulfonyl may have halogen atoms or alkyls in the nucleus. These compounds are suitable for dyeing natural fibers such as cotton, linen and wool, as well as fibers of synthetics such as rayon, viscose, polyvinyl alcohol, and polyamides, and are characterized by excellent light and wash fastness.

---

This invention relates to novel reactive dyes and to a method for dyeing fiber materials by use of the same.

More particularly, the invention pertains to novel bluish red dyes represented by the formula,

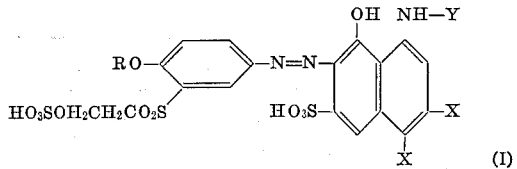

wherein R is methyl or ethyl; one X is a hydrogen atom and the other X is a sulfonic acid group; and Y is an acetyl or chloroacetyl or is a benzoyl or benzenesulfonyl, the benzoyl and benzenesulfonyl may have a halogen atom or alkyl in the nucleus.

It is well known that dyes having the group

—SO₂CH₂CH₂OSO₃H

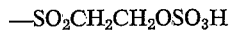

—SO₂CH=CH₂ or —SO₂CH₂CH₂Cl are used, as so-called reactive dyes, for the dyeing of fiber materials.

The present inventors examined the relationship between structure and properties of this kind of dyes to find that the dyes represented by the above-mentioned Formula I are not only excellent in fastness but also are prominent in clarity of hue. The novel reactive dyes of the present invention, represented by the above Formula I, are prepared by diazotizing 4-methoxy- or ethoxy-aniline-3-β-hydroxy-ethylsulfon, coupling the diazotization product with an aminonaphtholsulfonic acid represented by the formula,

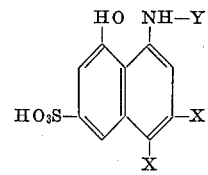

wherein X and Y are as defined above, and then esterifying with sulfuric acid the hydroxyl group of the β-hydroxyethylsulfon group; or by first diazotizing the above-mentioned amine component in the form of its sulfuric acid ester and then coupling the diazotization product with said aminonaphtholsulfonic acid.

The dyes obtained in accordance with the present method are suitable for the dyeing of various materials, particularly natural, or regenerated cellulose fibers such as cotton, linen, viscose rayon and viscose staple fibers, hydroxy-containing fibers such as polyvinyl alcohol fibers, and nitrogen-containing fibers such as wool and polyamides, and give dyed fibers having a unique clear bluish red color.

The dyeing by use of the present dyes is effected according to dip-dyeing, printing or padding method in the presence of an acid binding agent, like in the case of ordinary fiber reactive dyes. Alternatively, the dyeing may be carried out according to a process in which fixing treatment with an acid binding agent is effected after printing or padding.

The present dyes by themselves are novel compounds, and the resulting dyed products show markedly excellent light fastness and wet fastness. Further, in the case of dyes of the aforesaid formula, in which Y is a benzenesulfonyl group having or not having halogen atoms or alkyls, acid boiling fastness is particularly favorable.

The following examples illustrate the method for preparing the novel dyes of the present invention in which all the parts and percentages are by weight unless otherwise specified.

EXAMPLE 1

23.1 parts of 4-methoxyaniline-3-β-hydroxyethylsulfon is added to and dissolved in 114 parts of 98% sulfuric acid at 15°–20° C. After one hour, the solution is charged in 342 parts of ice water, and deposited crystals are separated by filtration. The resulting sulfate is added to 120 parts of ice water. The mixture is charged with 10 parts of hydrochloric acid and is then diazotized with cooling by adding dropwise an aqueous solution containing 6.35 parts of sodium nitrite.

On the other hand, 37.3 parts of 1-acetylamino-8-naphthol-3,6-disulfonic acid is dissolved in 300 parts of water, and the solution is adjusted to a neutral pH by use of 5.3 parts of sodium carbonate. To this solution, the diazo solution obtained in the above is added dropwise to effect coupling. During this coupling reaction, about 11 parts of sodium bicarbonate is added to adjust the solution to pH 6–7. After completion of the reaction, 110 parts of sodium chloride is added to the reaction solution, and the mixture is subjected to, filtration and drying to obtain 55 parts of a dye, in the form of a dark red powder, having the structural formula,

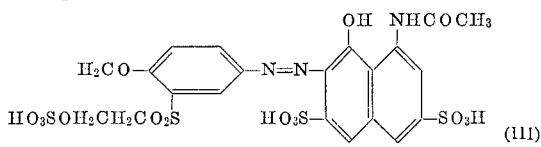
(III)

The thus obtained dye can dye cotton to a unique deep bluish red color, according to a dyeing process applied to a conventional reactive dye using sodium carbonate as an acid binding agent, and shows such excellent fastness as the 4–5 grade or more to both light and washing.

When the 1-acetylamino-8-naphthol-3,6-disulfonic acid is replaced by 1-benzoylamino-8-naphthol-3,6-disulfonic acid and 1-(2'- and 4'-chloro)-benzoylamino-8-naphthol-3,6-disulfonic acid, individually, there are obtained dyes of the structural formulas shown below which give fast dyed fibers having a red color somewhat stronger in bluishness than in the above-mentioned case.

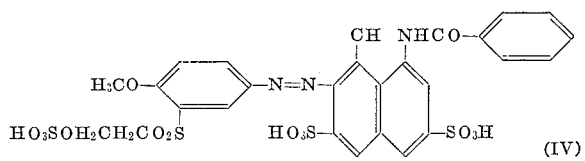
(IV)

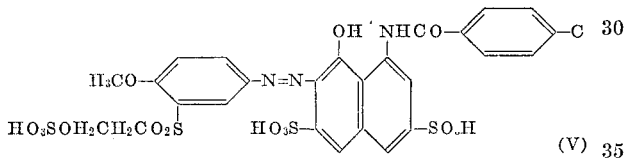
(V)

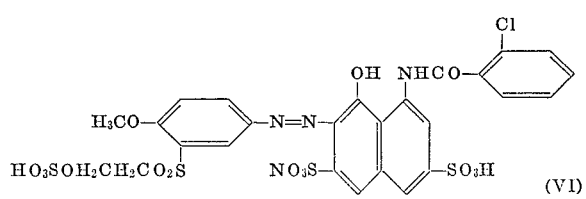
(VI)

Further, when the 4-methoxyaniline-3-β-hydroxyethyl-sulfon is replaced by 4-ethoxyaniline-3-β-hydroxyethyl-sulfon, there is obtained a dye of the structural formula shown below which gives a dyed fiber having a fast bluish red color siimlar to that mentioned above.

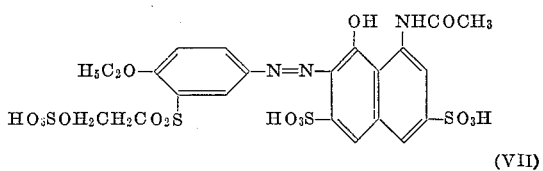
(VII)

EXAMPLE 2

23.1 parts of 4-methoxyaniline-3-β-hydroxyethylsulfon is dissolved in a solution comprising 200 parts of ice water and 10 parts of hydrochloric acid. The solution is diazotized by dropwise addition of an aqueous solution containing 6.9 parts of sodium nitrite.

On the other hand, 49.4 parts of 1-(4'-methyl)benzene-sulfoamino-8-naphthol-3,6-disulfonic acid is dissolved by use of 300 parts of water and 15 parts of sodium carbonate. To this solution, the diazo solution obtained in the above is added with cooling to effect coupling. After completion of the reaction, 100 parts of sodium chloride is added to the reaction solution, and the mixture is subjected to filtration and drying to obtain a powder. The powder is added to and dissolved in 150 parts of 100% sulfuric acid at 20° C. After 2 hours, the solution is charged in 300 parts of ice water. To the solution, 40 parts of potassium chloride is added, and the mixture is subjected to filtration. The resultant is dissolved in 300 parts of water, and the solution is neutralized to pH 6–7 by addition of potassium carbonate and is then charged with 45 parts of potassium chloride. Subsequently, the mixture is subjected to filtration and drying to obtain 60 parts of a dye, in the form of a dark red powder, having the structural formula,

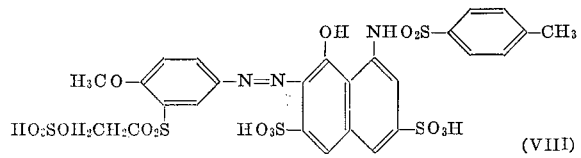
(VIII)

The thus obtained dye can dye cotton to a unique deep bluish red color, according to a dyeing process applied to conventional reactive dyes using caustic soda as an acid binding agent, and is excellent in light, washing and acid boiling fastness so as to show the 4–5 grade or more.

Even when 1 - benzenesulfoamino-8-naphthol-3,6-disulfonic acid is used in place of the 1-(4'-methyl) benzene-sulfoamino-8-naphthol-3,6 - disulfonic acid, there is obtained a dye (IX) of the same hue, while when 1-(4'-chloro-2',5'-dimethyl) benzenesulfoamino - 8 - naphthol-3,6-disulfonic acid, there is obtained a dye (X) having a red color more stronger in bluishness than above, and both dyes show fastness as excellent as in the above.

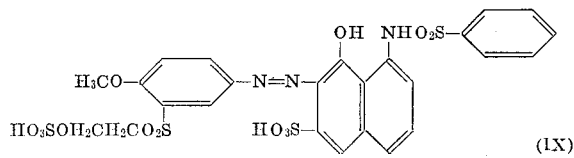
(IX)

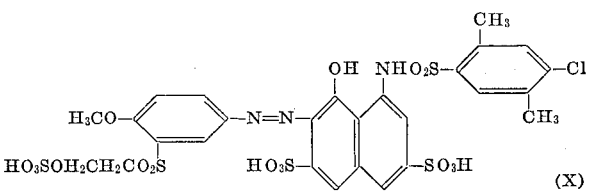
(X)

Further, when 1 - acetylamino-8-naphthol-3,6-disulfonic acid is used, there is obtained a dye identical with the dye (III) of Example 1.

EXAMPLE 3

When dyes are synthesized according to the process of Example 1 or 2, using 4-methoxyaniline-5-β-hydroxyethyl-sulfon and the azo components (A) shown in the table below, there are obtained dyes capable of giving on cotton fast colors of the hues represented by (B) in the following tables:

| (A) Azo component | (B) Hue |
| --- | --- |
| 1. 1-acetylamino-8-naphthol-4,6-disulfonic acid. | Bluish red. |
| 2. 1-benzoylamino-8-naphthol-4,6-disulfonic acid. | Red color (more bluish than 1). |
| 3. 1-(2'-chloro) benzoylamino-8-naphthol-4,6-disulfonic acid. | Do. |
| 4. 1-(4'-chloro) benzoylamino-8-naphthol-4,6-disulfonic acid. | Do. |
| 5. 1-(4'-chloro-2',5'-dimethyl) benzoyl-amino-8-naphthol-3,6-disulfonic acid. | Do. |
| 6. 1-(2',4'-dichloro) benzoylamino-8-naphthol-4,6-disulfonic acid. | |
| 7. 1-(2',4'-dichloro) benzoylamino-8-naphthol-3,6-disulfonic aicd. | Red color (more bluish than 6). |
| 8. 1-benzenesulfoamino-8-naphthol-4,6-disulfonic acid. | Bluish red (similar to 2). |
| 9. 1-benzenesulfoamino-8-naphthol-3,6-disulfonic acid. | Red color (more bluish than 8). |
| 10. 1-(4'-methyl) benzenesulfoamino-8-naphthol-4,6-disulfonic acid. | Do. |
| 11. 1-(4'-chloro-2',5'-dimethyl) benzene-sulfoamino-8-naphthol-4,6-disulfonic acid. | Do. |
| 12. 1-(4'-chloro-2',5'-dimethyl) benzene-sulfoamino-8-naphthol-3,6-disulfonic acid. | Do. |
| 13. 1-chloroacetylamino-8-naphthol-3,6-disulfonic acid. | Red color (more bluish than 2). |
| 14. 1-chloroacetylamino-8-naphthol-4,6-disulfonic acid. | Bluish red (similar to 2). |

Dyeing of fiber materials by use of the dyes in accordance with the present invention can be applied to a wide scope of dyeing processes such as the conventional dip dyeing, printing and pad dyeing. The dip dyeing of a cellulose fiber is carried out in a bath incorporated with Glauber's salt or sodium chloride at a relatively low temperature in the presence of an acid binding agent such as sodium phosphate, caustic soda or sodium carbonate. The pad dyeing is effected by applying an aqueous dye solution to a fiber and then, or simultaneously therewith, steaming or dry-heating the fiber at a relatively high temperature, e.g. 70°–180° C., in the presence of an acid binding agent such as sodium bicarbonate, sodium carbonate, caustic soda or sodium phosphate. Alternatively, the pad dyeing may be effected in such a manner that a fiber, to which a dye has independently been applied, is padded in a bath containing such an acid binder as mentioned above at a relatively high temperature, e.g. 80°–100° C. Thus, the acid binding agent may be added either after or simultaneously with the application of dye. Further, the fiber may be boiled in a water bath containing a large amount of an inorganic salt, in place of being steamed or dry-heated. The printing is effected by printing on a fiber a paste containing a dye and such an acid binding agent as mentioned above and then steaming or dry-heating the fiber at 70°–180° C., or by heat treating, in a bath containing such an acid binding agent as mentioned above, a fiber which has been printed with a paste containing only a dye, or by printing said printed fiber further with a paste containing the acid binding agent and then steaming or dry-heating the fiber. In the above case, it is also possible to effect resist-printing using a suitable acid, and discharge-printing using a suitable reducing agent.

The dip dyeing of an amino fiber is effected in a conventional neutral or acidic bath. It is, however, desirable that a suitable cationic surface active agent be used, and that after the dye exhaustion, the dye bath be neutralized with a weak alkali such as ammonia or hexamethylenetetramine and the dyeing be continued.

A dye which has not been fixed on the fiber is readily removable by soaping or water-washing carried out after the dyeing.

Next, the dyeing process using the dyes of the present invention will be illustrated below with reference to examples, in which all the parts and percentages are by weight unless otherwise specified.

EXAMPLE 4

0.3 part of the dye represented by the Formula III, prepared according to Example 1, is dissolved in 200 parts of water. To the solution, 10 parts of Glauber's salt or sodium chloride is added. The mixture is charged with 10 parts of cotton and is heated to 60° C. To the mixture, 2 parts of crystalline sodium phosphate or 0.2 part of a 40° Bé. caustic soda solution and 1 part of sodium carbonate, and dyeing is effected at said temperature for 1 hour. Subsequently, the cotton is subjected to water-washing and soaping to obtain a dyed product having a clear bluish red color fast to light and washing.

EXAMPLE 5

2 parts of the dye represented by the Formula VII, prepared according to Example 1, 10 parts of urea and 2 parts of sodium bicarbonate are dissolved in 100 parts of water at below 20° C. to form a solution. A cotton cloth is padded in said solution, is predried and is then steamed at 100°–103° C. for 7–10 minutes. Subsequently, the cotton cloth is subjected to water-washing and soaping to obtain a dyed product having a bluish red color fast to light and washing.

EXAMPLE 6

2 parts of the dye represented by the Formula IX, prepared according to Example 2, 3 parts of sodium bicarbonate and 5 parts of urea are dissolved in 100 parts of water at below 20° C. to form a solution. A cotton cloth is padded in said solution, is predried and is then dry-heated at 140° C. for 2 minutes. Subsequently, the cotton cloth is subjected to water-washing and soaping to obtain a dyed product having a clear red color fast to light and washing.

EXAMPLE 7

2 parts of the dye represented by the Formula VIII, prepared according to Example 2, 1 part of crystalline sodium tertiary phosphate and 1 part of 40° Bé. caustic soda are dissolved in 100 parts of water to form a solution. A cotton cloth is padded in said solution, is taken up as such and is allowed to stand at 40° C. for 10 hours. Subsequently, the cotton cloth is subjected to water-washing and soaping to obtain a dyed product having a clear red color fast to light and washing.

EXAMPLE 8

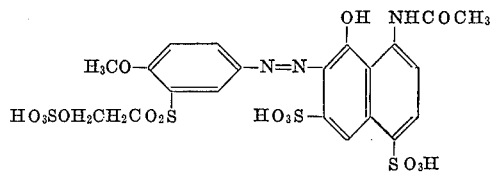

2 parts of the dye represented by the above structural formula, obtained according to Example 3(1), is dissolved in 100 parts of water to form a solution. A cotton cloth is padded in said solution, in predried, is further padded in a solution of 20 parts of sodium chloride and 2 parts of caustic soda in 100 parts of water, and is then steamed at 100°–103° C. for 20–30 seconds. Subsequently, the cotton cloth is subjected to water-washing and soaping to obtain a dyed product having a clear red color fast to light and washing.

EXAMPLE 9

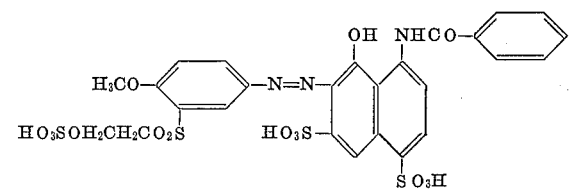

2 parts of the dye represented by the above structural formula, obtained according to Example 3(2), is dissolved in 100 parts of water to form a solution. A cotton cloth is padded in said solution, is predried, and is then dipped at 90° C. for 3 seconds in a solution of 20 parts of sodium carbonate, 10 parts of sodium chloride and 7 parts of 40° Bé. caustic soda in 100 parts of water. Subsequently, the cotton cloth is subjected to water-washing and soaping to obtain a dyed product having a clear bluish color fast to light and washing.

EXAMPLE 10

0.5 part of the dye represented by the Formula IV, obtained according to Example 1, and 5 parts of urea are dissolved in 30 parts of hot water. To the solution, 45 parts of a sodium alginate paste is added, and then the total amount of the mixture is adjusted to 100 parts by use of water or sodium alginate paste to form a paste. A cotton cloth is printed with said paste, is predried, and is then dipped at 95° C. for 10 seconds in 100 parts of a solution of 10 parts of sodium chloride, 15 parts of sodium carbonate, 5 parts of potassium carbonate, 5 parts of 40° Bé. caustic soda and 1 part of sodium silicate in water. Subsequently, the cotton cloth is subjected to water-washing and soaping to obtain a dyed product having a clear bluish red color fast to light and washing.

EXAMPLE 11

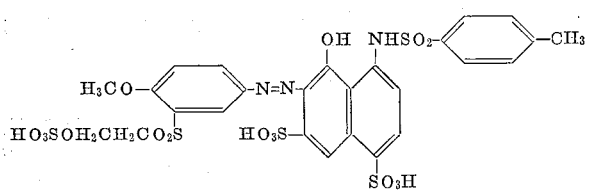

0.2 part of the dye represented by the above structural formula, obtained according to Example 3(10), is dissolved in 300 parts of water. To the dye solution, 3 parts of acetic acid is added, and 10 parts of wool is dipped in the solution. The dyeing of the wool is initiated at 50° C. and is continued for 1 hour while increasing the temperature to 90°–100° C. Thereafter, the dye solution is neutralized by addition of ammonia or hexamethylenetetramine, and the dyeing is further continued for about 30 minutes. Subsequently, the wool is subjected to waterwashing and soaping to obtain a dyed product having a bluish red color fast to light and washing.

EXAMPLE 12

The processes of Examples 4 to 11 are applied to the dyes represented by the structural formulas shown below, prepared according to Examples 1 and 3, to obtain dyed product having such clear hues as set forth below,

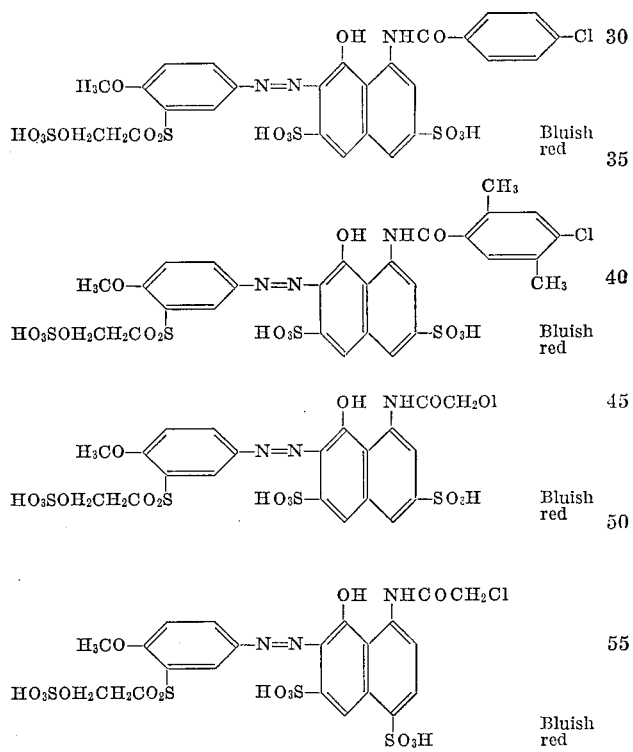

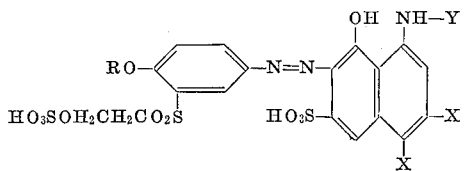

We claim:
1. A reactive dye represented by the formula, wherein R is methyl or ethyl; one X is hydrogen atom and the other X is sulfonic acid group; and Y is acetyl, chloroacetyl, benzoyl, 2- or 4-chlorobenzoyl, 2,4-dichlorobenzoyl, 2- or 4-methylbenzoyl, 2,4-dimethylbenzoyl, 4-chloro - 2,5 - dimethylbenzoyl, benzenesulfonyl, 2- or 4-chlorobenzenesulfonyl, 2,4-dichlorobenzenesulfonyl, 2- or 4-methylbenzenesulfonyl, 2,4-dimethylbenzenesulfonyl, or 4-chloro-2,5-dimethylbenzenesulfonyl.

2. A reactive dye represented by the formula,

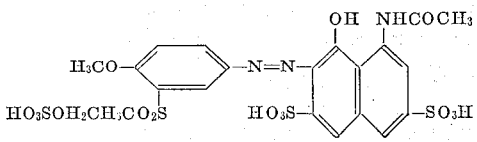

3. A reactive dye represented by the formula,

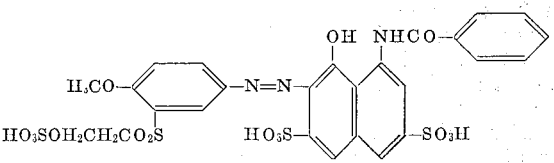

4. A reactive dye represented by the formula,

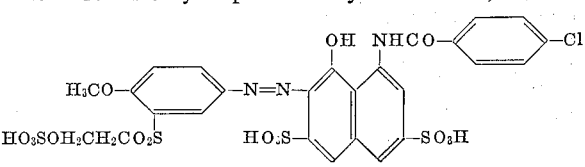

5. A reactive dye represented by the formula,

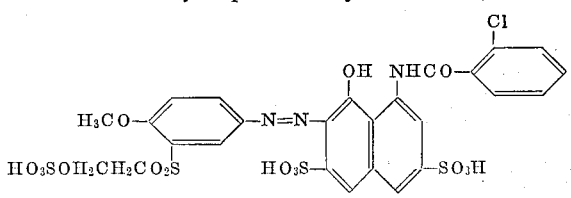

6. A reactive dye represented by the formula,

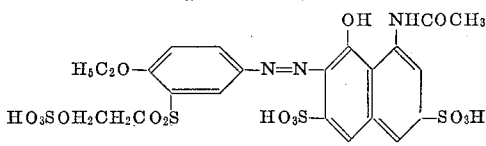

7. A reactive dye represented by the formula,

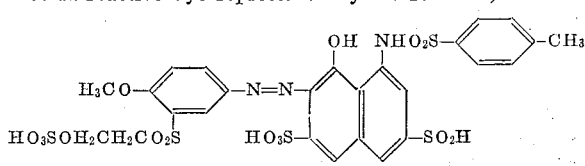

8. A reactive dye represented by the formula,

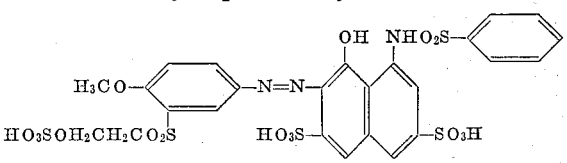

9. A reactive dye represented by the formula,

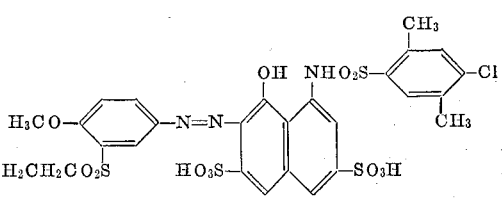

10. A reactive dye represented by the formula,

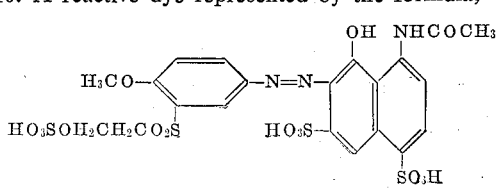

11. A reactive dye represented by the formula,

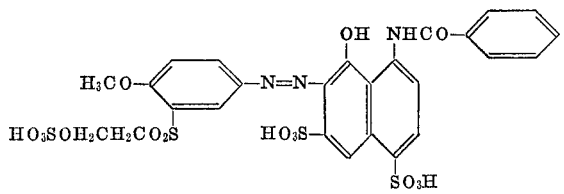

12. A reactive dye represented by the formula,

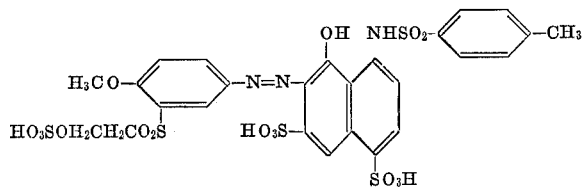

13. A reactive dye represented by the formula,

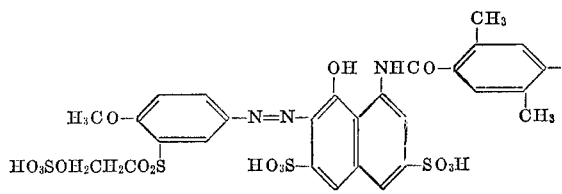

14. A reactive dye represented by the formula,

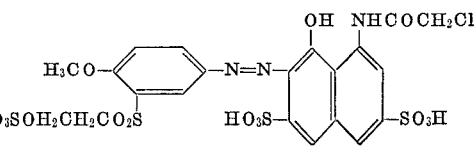

15. A reactive dye represented by the formula,

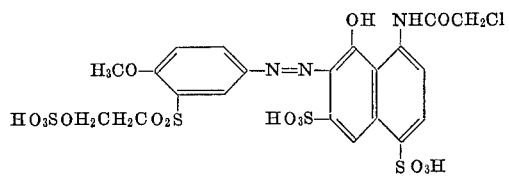

References Cited

UNITED STATES PATENTS

| | | | |
|---|---|---|---|
| 1,844,031 | 2/1932 | Clingestein et al. | 260—199 |
| 2,241,774 | 5/1941 | Fleischhauer et al. | 260—199 |
| 3,135,730 | 6/1964 | Heyna et al. | 260—198(X) |
| 3,202,652 | 8/1965 | Meininger et al. | 260—200 |
| 3,414,579 | 12/1968 | Remy | 260—199(X) |

CHARLES B. PARKER, Primary Examiner

C. F. WARREN, Assistant Examiner

U.S. Cl. X.R.

8—41, 50; 260—199